(12) United States Patent
Culhane (10) Patent No.: US 6,513,018 B1
(45) Date of Patent: Jan. 28, 2003

(54) METHOD AND APPARATUS FOR SCORING THE LIKELIHOOD OF A DESIRED PERFORMANCE RESULT

(75) Inventor: Patrick G. Culhane, San Anselmo, CA (US)

(73) Assignee: Fair, Isaac and Company, Inc., San Rafael, CA (US)

( * ) Notice: Subject to any disclaimer, the term of this patent is extended or adjusted under 35 U.S.C. 154(b) by 0 days.

(21) Appl. No.: 08/238,318

(22) Filed: May 5, 1994

(51) Int. Cl.[7] .............................................. G06F 17/00
(52) U.S. Cl. ...................................................... 705/35
(58) Field of Search ................................ 364/400, 401, 364/406, 408; 705/35, 38, 30, 34

(56) References Cited

U.S. PATENT DOCUMENTS

| | | | | |
|---|---|---|---|---|
| 3,316,395 A | * | 4/1967 | Lavin | 364/408 |
| 5,239,462 A | * | 8/1993 | Jones et al. | 364/408 |
| 5,262,941 A | * | 11/1993 | Saladin et al. | 364/408 |
| 5,274,547 A | * | 12/1993 | Zaffel et al. | 364/408 |

FOREIGN PATENT DOCUMENTS

JP   404247593 A  *  9/1992

OTHER PUBLICATIONS

Journal of Retail Banking, vol. 8, 1986, Overstreet et al., "Manegorial Control in Credit", pp. 79–86.*
Business Credit, vol. 90, 1988, Connors, "Credit Scoring", pp. 51–53.*
Data Sources, 1st Edition, 1990, vol. 2, pp. J–199 to J–203.*
"Recovery Scoring with a Twist", John Stewart, Credit Card Management, p. 12, Sep. 1992.*
"Reward Scores Credit Card Accounts for Increased Recovery", Credit Risk Management Report, vol. 3, No. 13, Jun. 21, 1993.*
"Card profits by the Numbers", Peter Brennan, Credit Card Management, p. 48, Sep. 1993.*
"Scoring for Profitability", Peter Brennan, Bank Technology News, p. 16, Sep. 1993.*
Recession Changes Customer Payment Patterns Credit Risk Management Report, V2, n18, Aug. 31, 1992.*

(List continued on next page.)

Primary Examiner—James P. Trammell
Assistant Examiner—Pierre E. Elisca
(74) Attorney, Agent, or Firm—Pillsbury Winthrop LLP (57) ABSTRACT

Apparatus and methods for generating a score predictive of the likelihood of a desired performance result for a selected receiver of that performance from a selected performer that includes memory means storing performance information of the selected performer for the selected receiver and storing matched performance information over the same relevant time interval of the selected performer for all receivers of similar performance; calculating means developing for the performer at least one first continuous variable of the performance for all receivers other than the selected receiver; calculating means developing for the performer at least one second continuous variable of the performance for the selected receiver; and accumulation means developing a performance score for the desired performance result from the first and second continuous variables.

21 Claims, 3 Drawing Sheets

OTHER PUBLICATIONS

"Recession Changes Customer Payment Patterns", Credit Risk Management Report, v2 n18, Aug. 31, 1992.*

Robins, Gary, "Scoring: Retailers Are Finding New Uses for the Technique", Stores, v74 n3, p. 45, Mar. 1992.*

Punch, Linda, "A Sobering Year for Collectors", Credit Card Management, v5 n3, pp. 52–56, Jun. 1992.*

Radding et al, "Credit Scoring's New Frontier Card Marketers Know the Score", Bank Management, v68 n9 pp. 55–64, Sep. 1992.*

Morrall, K. "Dear Deadbeat: Collections & Recovery", Credit Card Management, v5 n8 pp. 18–21, Nov. 1992.*

"Study Says Behavior Scores Do Predict Bankruptcies", Credit Risk Management Report, v2 n15, Jul. 20, 1992.*

"Expanded Scoring May Predict More About Account Performance", Credit Risk Management Report, v1 n19, Sep. 16, 1991.*

"Predicting Bankruptcy Risk: Software Taps 3 Credit Bureaus", American Banker, v158 n190, p. 12, Oct. 4, 1993.*

Fair, Isaac, "Experian/Fair, Isaac Risk Model", Fair, Isaac and Company, Incorporated, 1998, pp. 1–80.

* cited by examiner

FIG.3

METHOD AND APPARATUS FOR SCORING THE LIKELIHOOD OF A DESIRED PERFORMANCE RESULT

TECHNICAL FIELD

This invention relates generally to methods and apparatus for generating a score predictive of future performance based upon historic performance information and, more particularly, to methods and apparatus for enhancing the predictive value of such a score for a selected receiver of future performance from a selected performer by using tailored characteristics from a generic historical database including information on the performer's past performance for receivers in addition to the selected one.

BACKGROUND OF THE INVENTION

Empirical techniques that use statistical methods to predict the probability of desired performance results have heretofore been used in credit scoring, for example, to predict the probability of repayment by a credit applicant, as well as to predict other desired performance from a preselected one from an entire population of performers. Payment projection scores have been used for a number of years to assist credit issuers in prioritizing collection efforts on delinquent accounts based on internal account billing information.

Typical credit scoring systems evaluate certain historical financial and non-financial characteristics of a sample population of applicants in computer-usable form to derive a score predictive of future payment performance by a new unknown applicant who may not have been in that sample. Such scoring assumes that future performance within the population of all applicants will be consistent with past performance of the sample and identifies specific characteristics associated with past performance which collectively are most predictive of desired future performance results, such as repayment of a bank loan or credit card debt. Credit scoring, thus, assesses the credit quality of an individual about whom a decision is being made concerning the extension or use of credit. A scorecard is used to calculate the numeric value, or score, for each account considered for a credit decision.

Heretofore, developers of scoring systems have determined by discriminant analysis and other statistical techniques what combination of characteristics are positively or negatively correlated with desired performance results and have classified these predictive characteristics into attribute ranges, each having weighted score values. These attribute score values are accumulated for a particular performer, such as a credit applicant, for a set of identified characteristics to develop a total score predictive of the desired performance result.

The development and use of credit scoring, for example, has been described in a number of publications including the article entitled "Credit Scoring and the Equal Credit Opportunity Act" by David C. Hsia, *The Hastings Law Journal*, Volume 30, November 1978, No. 2, pages 382–404, and other publications.

SUMMARY OF THE INVENTION

In accord with the illustrative embodiment of this invention, the predictive value of a performance score may be enhanced by using tailored characteristics from a generic database that includes historic performance information about a selected performer relative to a number of receivers of similar performance from the performer.

The invention is particularly useful in connection with methods and apparatus for generating a collection score predictive of the likely repayment dollar amount from a selected debtor on a delinquent credit account for a selected credit issuer which uses billing and collection information for that debtor in credit bureau databases. The methods and apparatus identify the historically most predictive characteristics in a selected credit issuer database and matched generic collection information in a credit bureau database and develop a scaled score for the attributes for each relevant claracteristic. Then for a particular delinquent debtor, the delinquency and amount owed on a selected credit lender account is compared to that same information for all other accounts in the debtor's credit record to produce a score which rank orders all delinquent credit accounts according to the dollar amount likely to be repaid within a particular future time interval.

Thus, the described embodiment uses a credit bureau-based payment projection score developed from credit bureau information to predict the likely repayment dollar amount on a particular delinquent account. It effectively models a continuous performance variable of the expected dollar amount of repayment, the higher the better as the desired performance result. The amount owed on a particular credit grantor's account compared with the amount owed on delinquent accounts of all other credit grantors reflects the degree of collection competition and characteristics based on such a comparison have been found to enhance the predictive value of a collection score. So also have characteristics based on the relative level of the delinquent accounts.

One object of the invention, therefore, is to identify and use tailored characteristics as part of a generic model to fine tune the predictive capability of a score for each particular performance receiver which may differ among such receivers in the generic database.

One other object of the invention is to identify and utilize characteristics in a credit bureau database that collectively focus on predicting a collection performance as to dollar amount, rather than the odds of repayment.

Another object of the invention is by appropriate score to rank order a continuous performance variable such as the likely dollar amount collected, for multiple credit issuers in a credit bureau database.

Still other objects of the invention are a collection score that rank orders the likely repayment of multiple delinquent accounts for a credit issuer to enable collection managers to identify accounts which are more likely not to recover so as to dispose of them at an early date as well as to arrange collection queues so that accounts likely to pay a large amount are worked first before other accounts likely to pay a lesser amount.

DESCRIPTION OF THE PREFERRED EMBODIMENT OF THE INVENTION

Figure 1:
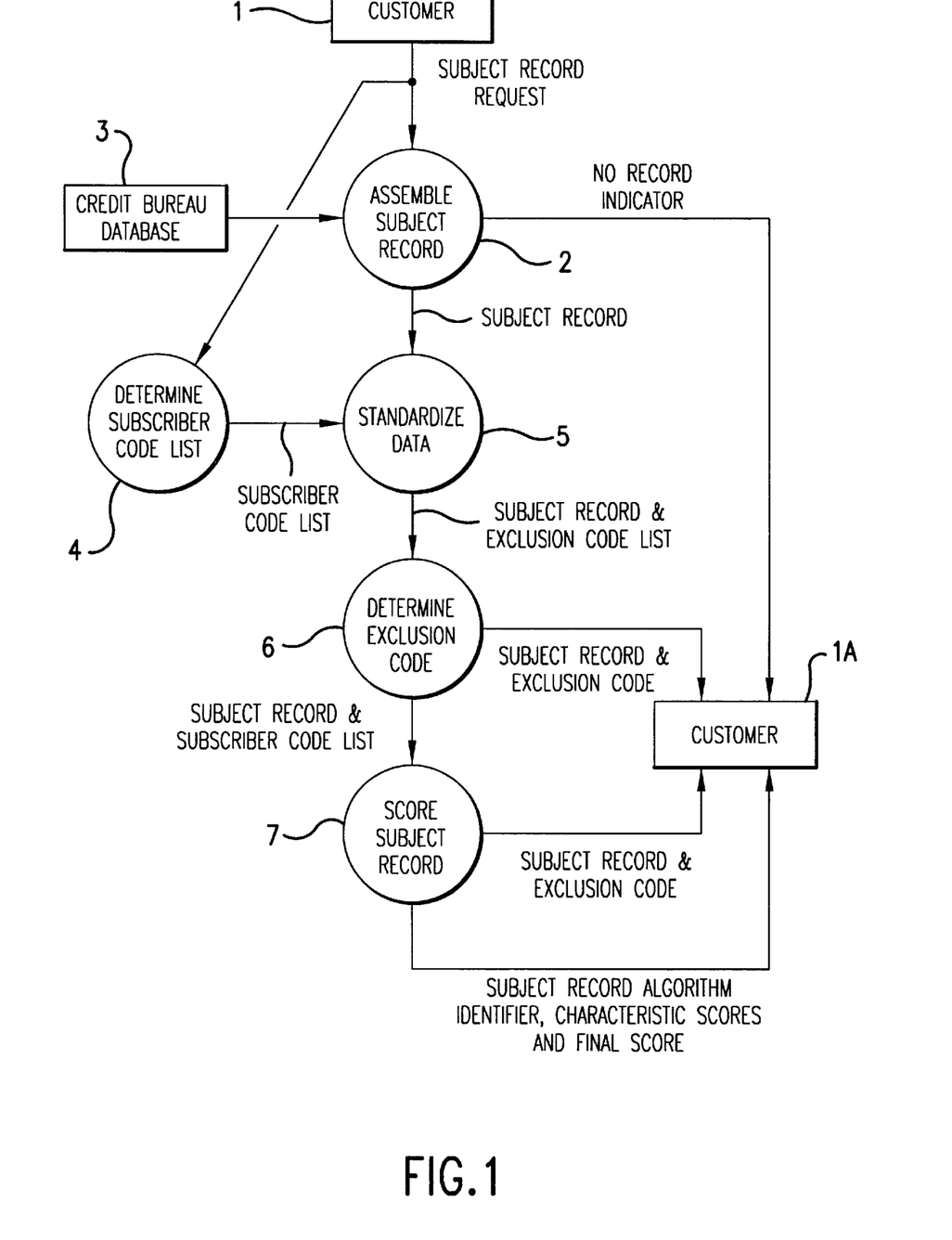
FIG. 1 is a data flow diagram illustrating the data processing for a scoring method and apparatus using a credit bureau database.

FIG. 1 is a flow diagram illustrating the data processing for what may be a computer-based scoring apparatus. A customer at 1 or subscriber of the credit bureau requests the subject record for a particular debtor. The computer assembles at 2 the subject record for that debtor from the credit bureau database 3. The subscriber code is determined at 4 and it, along with the subject record of the debtor, are standardized at 5. If there is no record of the subscriber's line of credit in the credit bureau database, that is indicated to the customer at 1A and the subsequent score is based upon standard characteristics generated from the credit bureau database.

An exclusion code is determined at 6 from the subject record of the debtor and an exclusion code list, both of which also are supplied to the customer at 1A. The subject record is scored at 7 and the characteristic scores, final score and the algorithm identifier (in some implementations) are supplied to the customer at 1A.

Figure 2:
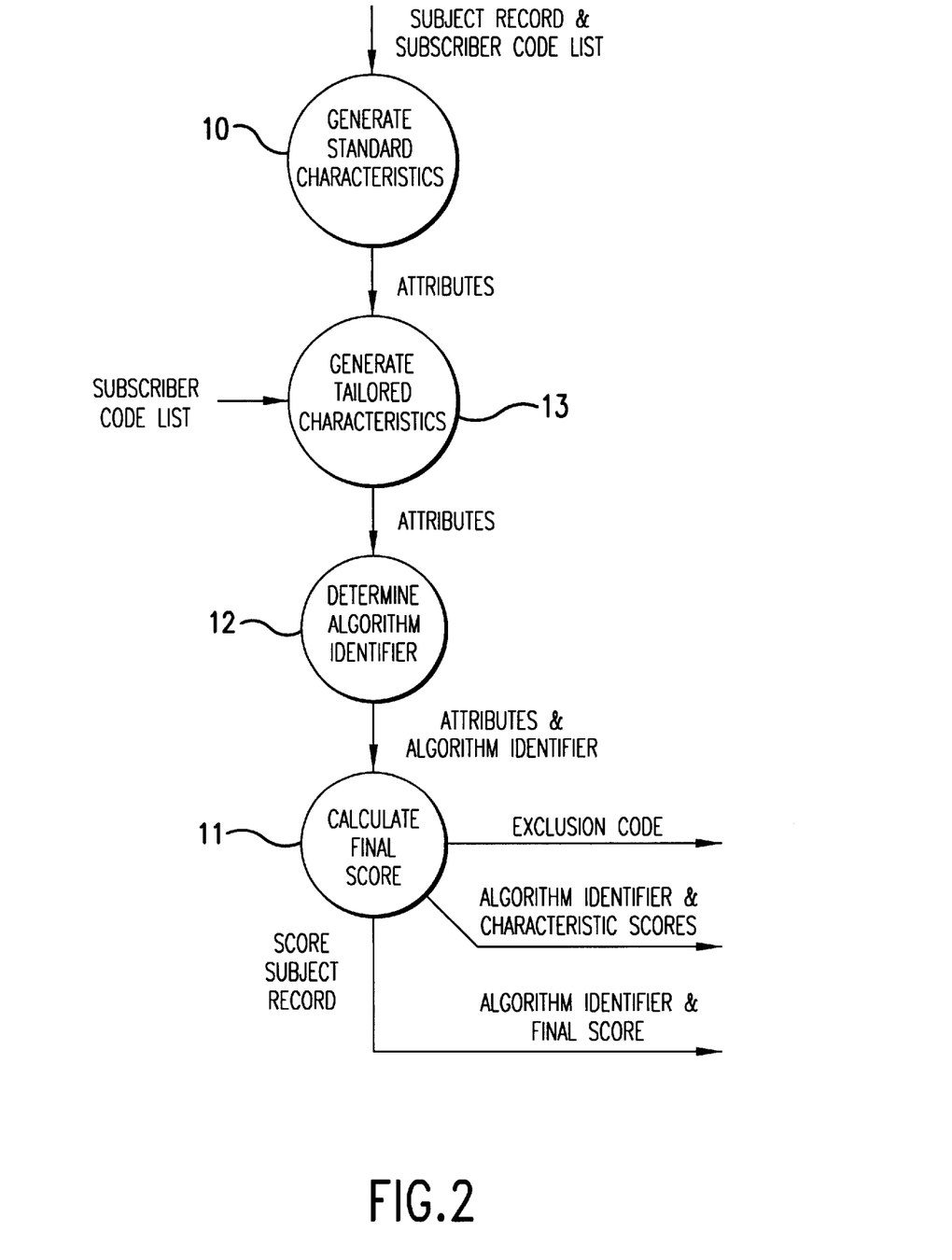
FIG. 2 is a data flow diagram for the process "score subject record" of FIG. 1, illustrating the generation of attributes for standard and tailored characteristics in accord with this invention.

In scoring the subject record at 7, the data is processed as shown in FIG. 2. The computer generates the attributes for standard characteristics most predictive of desired collection performance. If there is no record of the particular subscriber in the database, the attributes for those standard characteristics are used to calculate the final score at 11 after determination of the appropriate algorithm identifier for such a standard score. If subscriber data appears in the credit bureau database, the computer generates the attributes for tailored characteristics at 13 by comparison of the data for that subscriber with other corresponding credit issuers in the bureau database. Those attributes, too, are used to fine tune a final score based on those attributes for tailored characteristics specific to the requesting subscriber.

Figure 3:
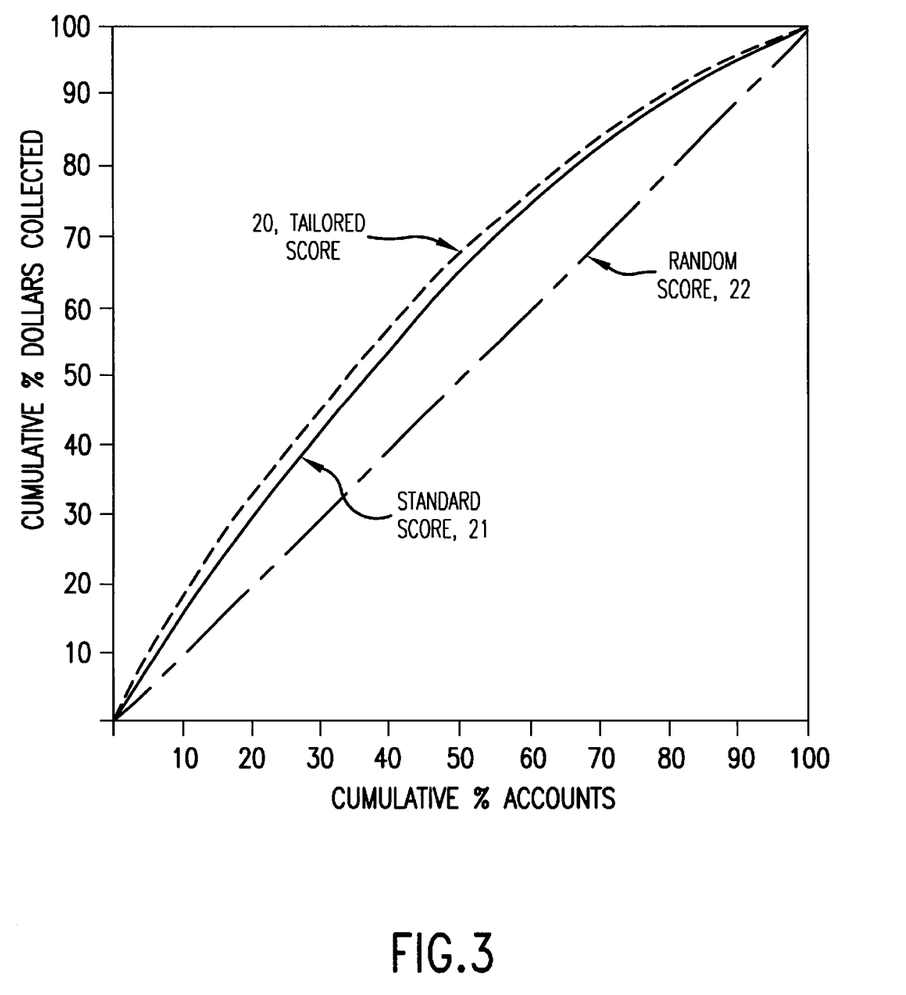
FIG. 3 is a graphic representation illustrating the improved predictive value of the tailored score of this invention.

FIG. 3 graphically illustrates the enhanced tailored score 20 which can be obtained from the credit bureau database as opposed to a standard score 21, both compared with what might be expected with a random sample 22 with, for example, 50% of the dollars collected from 50% of the accounts. The standard score is shown to improve that collection performance for 50% of the accounts to 65% of all collected dollars, whereas the tailored score shows an improvement to 67% or 68% of all collected dollars on that same 50% of the cumulative accounts.

Table I displays an exemplary credit bureau scorecard and Table II illustrates a score computation using that scorecard for a particular individual.

TABLE I

Exemplary Partial Credit Bureau Scorecard

| Characteristic | Attributes | Score Points |
| --- | --- | --- |
| Number of trade lines 90+ days delinquent or worse | 0 | 50 |
| | 1 | 45 |
| | 2 | 40 |
| | 3 | 30 |
| | 4 | 20 |
| | 5 or more | 10 |
| Total amount past due | Amount past due unknown | 20 |
| | <$ 1000 | 10 |
| | $ 1000–1999 | 15 |
| | $ 2000–2999 | 20 |
| | $ 3000+ | 30 |
| Average number of months in file | below 12 | 10 |
| | 12–23 | 15 |

TABLE I-continued

Exemplary Partial Credit Bureau Scorecard

| Characteristic | Attributes | Score Points |
| --- | --- | --- |
| | 24–47 | 20 |
| | 48 or more | 25 |
| Highest level of delinquency last reported | No current delinquencies yet reported | 20 |
| | 30 days | 25 |
| | 60 days | 15 |
| | 90 days | 10 |
| | 120 days or worse | 5 |

The exemplary scorecard comprises a partial set of characteristics that are collectively predictive of future collection performance. The attributes shown in the second column are classifications of nominal or interval scales pertaining to a particular characteristic which may be discrete such as "amount past due unknown" or may be continuous variables such as <$1000, $1000–1999, etc. Each attribute relates to a weighted value or number of "points" in the last column to be awarded for each particular attribute. The higher the value or points, the more probable is the desired performance result based on that characteristic. The total score is the sum of the points awarded for the selected attributes for all characteristics in the scorecard. Typically, credit bureau scorecards contain a greater number of characteristics than those shown in Table I.

As shown in Table II, if an individual's credit report contains two trade lines that are 90 days past due or worse, the attribute for the first characteristic selected would be "2" for 40 points. The individual's total amount past due may be $919 falling in the classified attribute range scored 10. The individual's record in the database may be for 21 months falling in the classified range scored 15 and the highest level of delinquency may be 60 days scored 15. The total predictive score for that particular individual, therefore, would be 80.

TABLE II

Exemplary Score Computation

| Characteristic | Individual's Attributes | Score Points |
| --- | --- | --- |
| Number of trade lines 90 days delinquent or worse | 2 | 40 |
| Total amount past due | $919 | 10 |
| Average number of months in file | 21 | 15 |
| Highest level of delinquency last reported | 60 days | 15 |
| Total Score | | 80 |

The collection score supplied in FIG. 1 at 7 was developed from credit bureau information taken as of an observation date and matched to master file performance information stored in computer memory representing a six-month period of performance results. In the particular embodiment, a population of interest was defined as all master file accounts currently three or more cycles delinquent and the corresponding information from the credit bureau stored database as of the observation date. The memory-stored performance information was merged and used to evaluate the correlation of performance to credit bureau characteristics which compared a customer or a particular subscriber account or trade line to non-customer or non-subscriber accounts or trade lines. A continuous performance variable comprising the sum of payments plus returns was selected to rank order dollars collected during the six-month performance period.

The characteristics that were most predictive of the maximum collection performance included (1) risk characteristics which measure consumer stability, (2) current level of delinquency, (3) previous delinquency and repayment that targeted whether or not a consumer had a history of being mildly delinquent and returning to current status, and (4) tailored characteristics that isolated account information for a specific credit grantor relative to other credit grantors in the credit bureau database.

The predictive characteristics can be grouped in four main categories:

Degree of Collection "Competition"

These characteristics measure the degree to which the individual is delinquent with other lenders, and consequently the degree to which the requester may be in competition with other lenders in trying to collect amounts owed.

History of Past Delinquency and Repayment

These characteristics measure a past history of recovery (i.e., payment on previous delinquent accounts). Individuals with a history of repaying previously missed payments tend to repay more than those without this history.

Current Level of Indebtedness and Delinquency

The level of current delinquency and amount owed, especially on the requester's specific trade lines, are very relevant to the relative amount expected to be repaid. Current levels of delinquency and amount owed across all trade lines are also strong predictive factors Amount of Time Credit Has Been in Use The length of file history, as measured by the trade line date opened fields, is indicative of future repayment on delinquent accounts. The shorter the file history, the lower the amount expected to be repaid.

It was found that consumers who were less delinquent currently than they were in the past tended to be those that had a habit of going delinquent and repaying. Tailored characteristics enhanced the predictive power of the resulting scorecard by addressing the issue that two credit grantors might have two very different chances for collection success based upon their relative delinquent balances. The tailored characteristics allowed a generic model to hone in on these differences. They include the total balance on a particular subscriber's account and the ratio of the delinquent balance on the subscriber's account to the total delinquent balances on all accounts.

The following characteristics were developed and evaluated for their predictive qualities:

| | |
|---|---|
| months since last subscriber trade line current status | cmoscrtg |
| number of subscriber trade lines | cntgtl |
| % delinquent balances on subscriber trade lines | cpctdbtg |
| max delinquency 0–23 - non-subscriber trade lines | cmdlqntg |
| max delinquency 0–23 - subscriber trade lines | cmdlqtg |
| % of total amount past due on subscriber trade lines | cppdtg |
| total amount past due on subscriber trade lines | camtpdtg |
| total amount past due on non-subscriber trade lines | camtpdn |
| total balance on non-subscriber delinquent trade lines | cbalntgd |
| total balance on subscriber delinquent trade lines | cbaltgd |
| subscriber current delinquency | ctgwrcdq |
| months since last subscriber 30 days past due | cmos30tg |
| months since last subscriber 30 days (alternate) | cmos30tx |
| % subscriber balances to total balance | cpcttgbl |
| % subscriber balances to total balance (alternate) | cptgrvbx |
| % subscriber balances to total revolving balance | cptgrvbl |
| % subscriber limits to total revolving limits | cptgrvlm |
| net fraction non-subscriber burden | cfrcntg |
| net fraction non-subscriber revolving burden | cfrcrntg |
| net fraction subscriber burden | cfrcttg |
| total balance on non-subscriber trade lines | cbalntg |
| total balance on subscriber trade lines | cbaltg |

The characteristics most predictive of a successful collection performance were average months in file number of trade lines last reported 90+ days delinquent % amount now past due of max historic past due total trade line balance net fraction of subscriber's accounts total balance on subscriber's trade lines for which the weights and statistics are on following pages 13 and 14:

WEIGHTS AND STATISTICS

| Step | Char/Attr | Main % LPrin | Main % RPrin | Main Woe | Wt | Main Marg.Cntr | Rest Oper | Rest Expr | HoldOut % LPrin | HoldOut % RPrin | HoldOut Woe | HoldOut Marg.Cntr |
|---|---|---|---|---|---|---|---|---|---|---|---|---|
| | Net fraction subscriber burden | — | — | — | — | 0.025 | | | — | — | — | 0.026 |
| | no subscriber tradeline | 0.009 | 0.001 | 2.07 | 0.00 | 0.000 | = | 0.000 | 0.001 | 0.001 | −0.18 | 0.000 |
| | no subs. updated t.l. | 0.000 | 0.002 | −2.12 | 0.00 | −.000 | = | 0.000 | 0.000 | 0.002 | −1.37 | −.000 |
| | 0–<20 | 0.016 | 0.044 | −1.03 | −1.21 | 0.014 | < | 3 | 0.017 | 0.046 | −0.97 | 0.019 |
| | 20–<60 | 0.108 | 0.139 | −0.25 | −0.30 | 0.006 | < | 4 | 0.110 | 0.141 | −0.25 | 0.006 |
| | 60–<80 | 0.124 | 0.119 | 0.05 | −0.04 | 0.000 | < | 5 | 0.132 | 0.112 | 0.16 | −.001 |
| | 80–<95 | 0.192 | 0.165 | 0.15 | 0.06 | 0.001 | < | 6 | 0.204 | 0.164 | 0.22 | 0.002 |
| | 95–<100 | 0.135 | 0.109 | 0.21 | 0.14 | 0.003 | > | 7 | 0.128 | 0.111 | 0.15 | 0.001 |
| | 100–<105 | 0.178 | 0.154 | 0.15 | 0.12 | 0.001 | > | 8 | 0.176 | 0.157 | 0.12 | −.001 |
| | 105–<120 | 0.201 | 0.228 | −0.12 | 0.12 | −.003 | > | 9 | 0.207 | 0.230 | −0.10 | −.001 |
| | 120–High | 0.037 | 0.040 | −0.07 | 0.12 | 0.001 | | | 0.023 | 0.037 | −0.48 | −.002 |
| | NO INFORMATION | — | — | — | 0.00 | — | | | — | — | — | — |
| | Total balance subscriber t.l. | — | — | — | — | 0.028 | | | — | — | — | 0.021 |
| | no subscriber trade line | 0.009 | 0.001 | 2.07 | 0.00 | 0.000 | = | 0.000 | 0.001 | 0.001 | −0.18 | 0.000 |
| | no subscriber updated t.l. | 0.000 | 0.000 | −0.89 | 0.00 | −.000 | = | 0.000 | 0.000 | 0.000 | 0.59 | 0.000 |
| | 0–<200 | 0.004 | 0.016 | −1.44 | −0.17 | 0.000 | < | 3 | 0.005 | 0.016 | −1.13 | 0.000 |
| | 200–<500 | 0.009 | 0.027 | −1.08 | −0.17 | 0.001 | < | 4 | 0.008 | 0.026 | −1.19 | 0.001 |
| | 500–<1500 | 0.058 | 0.114 | −0.67 | −0.17 | 0.008 | < | 5 | 0.060 | 0.117 | −0.66 | 0.008 |
| | 1500–<3000 | 0.245 | 0.283 | −0.15 | −0.17 | 0.006 | < | 6 | 0.247 | 0.270 | −0.09 | 0.001 |

-continued

WEIGHTS AND STATISTICS

| Step | Char/Attr | Main % LPrin | Main % RPrin | Main Woe | Wt | Main Marg.Cntr | Rest Oper | Rest Expr | HoldOut % LPrin | HoldOut % RPrin | HoldOut Woe | HoldOut Marg.Cntr |
|---|---|---|---|---|---|---|---|---|---|---|---|---|
| | 3000–<4000 | 0.197 | 0.186 | 0.05 | 0.00 | 0.000 | < | 7 | 0.209 | 0.198 | 0.05 | 0.000 |
| | 4000–<5000 | 0.125 | 0.100 | 0.22 | 0.14 | 0.002 | < | 8 | 0.111 | 0.101 | 0.09 | −.001 |
| | 5000–High | 0.353 | 0.272 | 0.26 | 0.16 | 0.008 | | | 0.358 | 0.269 | 0.28 | 0.009 |
| | % subscriber balance to total balance | — | — | — | — | 0.013 | | | — | — | — | 0.010 |
| | no subscriber trade line | 0.009 | 0.001 | 1.78 | 0.00 | 0.000 | = | 0.000 | 0.002 | 0.002 | −0.01 | 0.000 |
| | 0–<5 | 0.014 | 0.036 | −0.90 | −0.27 | 0.002 | < | 2 | 0.017 | 0.040 | −0.83 | 0.003 |
| | 5–<10 | 0.068 | 0.103 | −0.42 | −0.27 | 0.008 | < | 3 | 0.074 | 0.094 | −0.23 | 0.001 |
| | 10–<20 | 0.224 | 0.233 | −0.04 | −0.04 | 0.000 | < | 4 | 0.211 | 0.219 | −0.04 | 0.000 |
| | 20–<60 | 0.445 | 0.407 | 0.09 | 0.03 | 0.000 | < | 5 | 0.425 | 0.415 | 0.02 | −.001 |
| | 60–<90 | 0.132 | 0.106 | 0.22 | 0.12 | 0.002 | < | 6 | 0.124 | 0.107 | 0.15 | 0.001 |
| | 90–<100 | 0.043 | 0.029 | 0.40 | 0.12 | 0.002 | < | 7 | 0.046 | 0.030 | 0.43 | 0.002 |
| | 100 | 0.066 | 0.085 | −0.26 | 0.12 | −.003 | | | 0.100 | 0.094 | 0.06 | 0.002 |
| | NO INFORMATION | 0.000 | 0.000 | — | 0.00 | — | | | — | — | — | — |
| | Highest subscriber current delq. | — | — | — | — | 0.017 | | | — | — | — | 0.011 |
| | not curr delq | 0.086 | 0.072 | 0.17 | 0.00 | 0.000 | = | 0.000 | 0.101 | 0.079 | 0.25 | 0.000 |
| | derog/120+ | 0.173 | 0.253 | −0.38 | −0.20 | 0.010 | < | 2 | 0.186 | 0.253 | −0.31 | 0.008 |
| | 90 days | 0.167 | 0.180 | −0.08 | 0.03 | 0.000 | < | 3 | 0.160 | 0.166 | −0.03 | 0.000 |
| | 60 days | 0.239 | 0.221 | 0.08 | 0.03 | 0.000 | < | 4 | 0.235 | 0.222 | 0.06 | 0.000 |
| | 30 days | 0.335 | 0.273 | 0.21 | 0.11 | 0.004 | | | 0.318 | 0.280 | 0.13 | 0.000 |
| | NO INFORMATION | 0.000 | 0.000 | — | 0.00 | — | | | — | — | — | — |
| | Months since last 30 day subscriber delq. | — | — | — | — | 0.010 | | | — | — | — | 0.016 |
| | never 30 days | 0.035 | 0.032 | 0.09 | 0.00 | 0.000 | = | 0.000 | 0.035 | 0.030 | 0.17 | 0.000 |
| | only undt 30 | 0.064 | 0.067 | −0.04 | 0.13 | 0.001 | | | 0.066 | 0.073 | −0.11 | −.001 |
| | 0–1 | 0.294 | 0.239 | 0.21 | −0.07 | 0.001 | < | 3 | 0.280 | 0.249 | 0.12 | 0.002 |
| | 2 | 0.206 | 0.199 | 0.04 | −0.07 | 0.000 | < | 4 | 0.205 | 0.192 | 0.07 | −.001 |
| | 3 | 0.116 | 0.132 | −0.13 | −0.07 | 0.001 | < | 5 | 0.123 | 0.134 | −0.09 | 0.001 |
| | 4 | 0.088 | 0.106 | −0.19 | −0.00 | −.000 | < | 6 | 0.068 | 0.103 | −0.41 | 0.000 |
| | 5 | 0.059 | 0.093 | −0.46 | −0.00 | 0.000 | < | 7 | 0.061 | 0.084 | −0.32 | 0.000 |
| | 6–<11 | 0.106 | 0.104 | 0.02 | 0.26 | 0.006 | < | 8 | 0.125 | 0.107 | 0.15 | 0.010 |
| | 11–<13 | 0.012 | 0.011 | 0.12 | 0.29 | 0.001 | g | 0 | 0.007 | 0.009 | −0.22 | −.001 |
| | 13–High | 0.019 | 0.017 | 0.13 | 0.29 | 0.000 | g | 0 | 0.030 | 0.019 | 0.43 | 0.004 |
| | NO INFORMATION | — | — | — | 0.00 | — | | | — | — | — | — |

The scaled values resulting for each characteristic are called attributes. Score points are assigned based on the attribute values. For example, if the characteristic evaluated is "the number of months in file," the answer could be the attribute, "48 months." A certain number of points would be assigned for a file 48 months old, which may be different than the number of points awarded for the attribute "12 months."

The most predictive combination of weight values for each characteristic was determined, which maximized the ability to accurately rank order the accounts by the likely amount that will be repaid.

Score points for both the Tailored and General scorecards were scaled so that resulting total scores range from 100 to over 400. Both scorecards are scaled consistently, meaning that a score will represent the same dollar amount likely to be repaid no matter which scorecard was used to determine the score. A high score indicates a higher amount expected to be repaid than with a lower score.

The resultant scorecard developed for a tailored score is shown on Table III. The score results were validated in accord with the collection performance shown in Table IV.

TABLE III

| TAILORED SCORE QUINTILE | AVERAGE $ COLLECTED PER ACCOUNT | CHARGE-OFF RATE | RATIO OF $ COLLECTED TO INITIAL BALANCE |
|---|---|---|---|
| 1 | $94 | 70% | 4.3% |
| 2 | $177 | 58% | 6.1% |
| 3 | $278 | 49% | 8.5% |
| 4 | $372 | 41% | 10.5% |
| 5 | $502 | 31% | 11.9% |

TABLE IV

| % OF POPULATION (QUINTILE) | QUINTILE SCORE INTERVAL | AVERAGE $ COLLECTED PER ACCOUNT |
|---|---|---|
| GENERAL SCORECARD | | |
| Lowest 20% | <= 281 | $138 |
| Next low 20% | 282–296 | $230 |
| Middle 20% | 297–309 | $286 |
| 2nd high 20% | 310–322 | $353 |
| Highest 20% | 323+ | $496 |
| TAILORED SCORECARD | | |
| Lowest 20% | <= 274 | $126 |
| Next low 20% | 275–289 | $219 |
| Middle 20% | 290–302 | $267 |

TABLE IV-continued

| % OF POPULATION (QUINTILE) | QUINTILE SCORE INTERVAL | AVERAGE $ COLLECTED PER ACCOUNT |
|---|---|---|
| 2nd high 20% | 303–317 | $343 |
| Highest 20% | 318+ | $538 |

One can see that score of this invention is designed to rank order likely dollars collected and not necessarily the odds of repayment. This departure from the traditional dichotomous performance variable to a continuous performance variable is a unique option in scorecard building. The score of this invention is an extension of the library of credit bureau characteristics that normally hones in on predicting collection performance. The use of tailored characteristics in a generic model evaluates the trade lines of the credit grantor making the score request separately from the remaining trade lines in the credit bureau report. This allows for the predictive capability of the score to be fine tuned to each credit grantor.

The invention develops a set of characteristics that target whether or not the consumer has a history of being mildly delinquent and returning to current status. This "return to current status" is what separates the collection score delinquency characteristics from a standard risk score set. A course classing of the characteristic "maximum delinquency -0-11 months vs. prior" determines the maximum delinquency on the credit bureau data and then dates it as either in the previous 0-11 months or older than that. Recent delinquencies are more negative than older ones, indicating consumers that are less delinquent now than they were in the past tend to be those that have a habit of going delinquent and repaying.

The invention also generates a series of characteristics evaluating current delinquency. This again is an expansion on the standard risk characteristics evaluating highest historic delinquency.

In addition, tailored characteristics pull out account information specific to a particular credit grantor. These characteristics include "total balance on inquirer's trade lines" and "ratio of the balance on inquirer's trade lines to total balance." These characteristics enhance the predictive power of the final score. They also address the issue that two credit grantors might have two very different chances for collection success based on the balances delinquent, the initial delinquency and other factors. These tailored characteristics will allow a generic model to hone in on these differences.

I claim:

1. A method performed on a computer of predicting a likely repayment amount from a debtor who owes an amount to a selected creditor, the method comprising:
   (A) determining on a computer a collection score based on:
      (i) amounts owed by the debtor only to creditors other than the selected creditor retrieved from an electronic database, and
      (ii) the amount owed by the debtor only to the selected creditor retrieved from an electronic database;
      wherein the collection score is further based on tailored characteristics from a generic database comprising:
      average months in file;
      number of trade lines last reported over 90 days delinquent;
      percentage amount now past due of maximum historic past due;
      total trade line balance;
      net fraction of subscriber's accounts; and
      total balance on subscriber's trade lines; and
   (B) determining the likely repayment amount based on the collection score and the amount owed to the selected creditor.

2. A method performed on a computer of predicting a likely repayment amount from a debtor who owes an amount to a selected creditor, the method comprising:
   (A) determining a collection score based on amounts owed by the debtor only to creditors other than the selected creditor, wherein the collection score is further based on tailored characteristics from a generic database, wherein the tailored characteristics from a generic database comprise at least one of:
      average months in file;
      number of trade lines last reported over 90 days delinquent;
      percentage amount now past due of maximum historic past due;
      total trade line balance;
      net fraction of subscriber's accounts; and
      total balance on subscriber's trade lines; and
   (B) determining the likely repayment amount based on the collection score and the amount owed to the selected creditor.

3. A method performed on a computer as in claim 2 wherein the collection score is determined based also on the amount owed by the debtor only to the selected creditor.

4. A method performed on a computer of predicting a likely repayment amount from a debtor who owes an amount to a selected creditor, the method comprising:
   (A) determining on a computer a first score based on amounts owed by the debtor only to creditors other than the selected creditor
   (B) determining on a computer a second score based on an amount owed by the debtor only to the selected creditor;
   (C) determining on a computer a collection score based on the first and second scores, wherein the collection score is further based on tailored characteristics from a generic database, comprising:
      average months in file;
      number of trade lines last reported over 90 days delinquent;
      percentage amount now past due of maximum historic past due;
      total trade line balance;
      net fraction of subscriber's accounts; and
      total balance on subscriber's trade lines; and
   (D) determining on a computer the likely repayment amount based on the collection score and the amount owed to the selected creditor.

5. A method performed on a computer of predicting a likely repayment amount from a debtor who owes an amount to a selected creditor, the method comprising:
   (A) determining on a computer a first score based on amounts owed by the debtor only to creditors other than the selected creditor retrieved from an electronic database, wherein the first score is further based on at least one of the following tailored characteristics from a generic database:
      average months in file;
      number of trade lines last reported over 90 days delinquent;
      percentage amount now past due of maximum historic past due;

total trade line balance;
net fraction of subscriber's accounts; and
total balance on subscriber's trade lines; and
(B) determining on a computer a second score based on an amount owed by the debtor only to the selected creditor retrieved from an electronic database;
(C) determining on a computer a collection score based on the first and second scores, wherein the collection score is further based on tailored characteristics from a generic database; and
(D) determining on a computer the likely repayment amount based on the collection score and the amount owed to the selected creditor.

6. A method performed on a computer of predicting a likely repayment amount from a debtor who owes an amount to a selected creditor, the method comprising;
(A) determining on a computer a first score based on amounts owed by the debtor only to creditors other than the selected creditor retrieved from an electronic database;
(B) determining on a computer a second score based on an amount owed by the debtor only to the selected creditor retrieved from an electronic database, wherein the second score is further based on at least one of the following tailored characteristics from a generic database:
average months in file;
number of trade lines last reported over 90 days delinquent;
percentage amount now past due of maximum historic past due;
total trade line balance;
net fraction of subscriber's accounts; and
total balance on subscriber's trade lines; and
(C) determining on a computer a collection score based on the first and second scores, wherein the collection score is further based on tailored characteristics from a generic database; and
(D) determining on a computer the likely repayment amount based on the collection score and the amount owed to the selected creditor.

7. A method performed on a computer of predicting a likely repayment amount from a debtor who owes an amount to a selected creditor, the method comprising:
(A) determining on a computer a first score based on amounts owed by the debtor only to creditors other than the selected creditor retrieved from an electronic database;
(B) determining on a computer a second score based on an amount owed by the debtor only to the selected creditor retrieved from an electronic database;
(C) determining on a computer a collection score based on the first and second scores, wherein the collection score is further based on tailored characteristics from a generic database, wherein the tailored characteristics from a generic database comprise:
average months in file;
number of trade lines last reported over 90 days delinquent;
percentage amount now past due of maximum historic past due;
total trade line balance;
net fraction of subscriber's accounts; and
total balance on subscriber's trade lines; and
(D) determining on a computer the likely repayment amount based on the collection score and the amount owed to the selected creditor.

8. A computer-based system for predicting a likely repayment amount from a debtor who owes an amount to a selected creditor, the system comprising:
(A) a mechanism constructed and adapted to determine a collection score based on
(i) amounts owed by the debtor only to creditors other than the selected creditor;
(ii) the amount owed by the debtor only to the selected creditor; and; and
(iii) the following tailored characteristics from a generic database:
average months in file:
number of trade lines 1;st reported over 90 days delinquent;
percentage amount now past due of maximum historic past due;
total trade line balance;
net fraction of subscriber's accounts; and
total balance on subscriber's trade lines; and
(B) a mechanism constructed and adapted to determine the likely repayment amount based on the collection score and the amount owed to the selected creditor.

9. A computer-based system for predicting a likely repayment amount from a debtor who owes an amount to a selected creditor, the system comprising:
(A) a mechanism constructed and adapted to determine a collection score based on amounts owed by the debtor only to creditors other than the selected creditor, wherein the collection score is further based on at least one of the following tailored characteristics from a generic database:
average months in file;
number of trade lines last reported over 90 days delinquent;
percentage amount now past due of maximum historic past due;
total trade line balance;
net fraction of subscriber's accounts; and
total balance on subscriber's trade lines; and
(B) a mechanism constructed and adapted to determine the likely repayment amount based on the collection score and the amount owed to the selected creditor.

10. A computer-based system as in claim 9 wherein the collection score is determined based also on the amount owed by the debtor only to the selected creditor.

11. A computer-based system for predicting a likely repayment amount from a debtor who owes an amount to a selected creditor, the system comprising:
(A) a mechanism constructed and adapted to determine a first score based on amounts owed by the debtor only to creditors other than the selected creditor:
(B) a mechanism constructed and adapted to determine a second score based on an amount owed by the debtor only to the selected creditor
(C) a mechanism constructed and adapted to determine a collection score based on the first and second scores, wherein the collection score is further based on tailored characteristics from a generic database comprising:
average months in file;
number of trade lines last reported over 90 days delinquent;
percentage amount now past due of maximum historic past due;
total trade line balance;
net fraction of subscriber's accounts; and
total balance on subscriber's trade lines; and (D) a mechanism constructed and adapted to determine the likely repayment amount based on the collection score the owed to the selected creditor.

12. A computer-based system for predicting a likely repayment amount from a debtor who owes an amount to a selected creditor, the system comprising:

(A) a mechanism constructed and adapted to determine a first score based on amounts owed by the debtor only to creditors other than the selected creditor, wherein the first score is further based on at least one of the following tailored characteristics from a generic database:
average months in file;
number of trade lines last reported over 90 days delinquent;
percentage amount now past due of maximum historic past due;
total trade line balance;
net fraction of subscriber's accounts; and
total balance on subscriber's trade lines; and (B) a mechanism constructed and adapted to determine a second score based on an amount owed by the debtor only to the selected creditor;

(C) a mechanism constructed and adapted to determine a collection score based on the first and second scores; wherein the collection score is further based on tailored characteristics for a generic database, and (D) a mechanism constructed and adapted to determine the likely repayment amount based on the collection score and the amount owed to the selected creditor.

13. A computer-based system for predicting a likely repayment amount from a debtor who owes an amount to a selected creditor, the system comprising:

(A) a mechanism constructed and adapted to determine a first score based on amounts owed by the debtor only to creditors other than the selected creditor;

(B) a mechanism constructed and adapted to determine a second score based on an amount owed by the debtor only to the selected creditor, wherein the second score is further based on at least one of the following tailored characteristics from a generic database:
average months in file;
number of trade lines last reported over 90 days delinquent;
percentage amount now past due of maximum historic past due;
total trade line balance;
net fraction of subscriber's accounts; and
total balance on subscriber's trade lines; and (C) a mechanism constructed and adapted to determine a collection score based on the first and second scores; wherein the collection score is further based on tailored characteristics for a generic database, and:

(D) a mechanism constructed and adapted to determine the likely repayment amount based on the collection score and the amount owed to the selected creditor.

14. A computer-based system for predicting a likely repayment amount from a debtor who owes an amount to a selected creditor, the system comprising:

(A) a mechanism constructed and adapted to determine a first score based on amounts owed by the debtor only to creditors other than the selected creditor;

(B) a mechanism constructed and adapted to determine a second score based on an amount owed by the debtor only to the selected creditor;

(C) a mechanism constructed and adapted to determine a collection score based on the first and second scores, wherein the collection score is further based on tailored characteristics from a generic database comprising:
average months in file;
number of trade lines last reported over 90 days delinquent;
percentage amount now past due of maximum historic past due;
total trade line balance;
net fraction of subscriber's accounts; and
total balance on subscriber'trade lines; and (D) a mechanism constructed and adapted to determine the likely repayment amount based on the collection score and the amount owed to the selected creditor.

15. A computer-readable medium with program instructions for predicting a likely repayment amount from a debtor who owes an amount to a selected creditor, the program comprising a method, which, when executed on a computer system, causes the computer system to:

(A) determine a collection score based on:
(i) amounts owed by the debtor only to creditors other than the selected creditor,
(ii) the amount owed by the debtor only to the selected creditor, and
(iii) wherein the collection score is based on tailored characteristics from a generic database, comprising:
average months in file;
number of trade lines last reported over 90 days delinquent;
percentage amount now past due of maximum historic past due;
total trade line balance;
net fraction of subscriber's accounts; and
total balance on subscriber's trade lines;

(B) determine the likely repayment amount based on the collection score and the amount owed to the selected creditor.

16. A computer-readable medium with program instructions for predicting a likely repayment amount from a debtor who owes an amount to a selected creditor, the program comprising a method, which, when executed on a computer system, causes the computer system to:

(A) determine a collection score based on amounts owed by the debtor only to creditors other than the selected creditor, wherein the collection score is further based on at least one of the following tailored characteristics from a generic database:
average months in file;
number of trade lines last reported over 90 days delinquent;
percentage amount now past due of maximum historic past due;
total trade line balance;
net fraction of subscriber's accounts; and
total balance on subscriber's trade lines; and (B) determine the likely repayment amount based on the collection score and the amount owed to the selected creditor.

17. A computer-readable medium with program instructions as in claim 16 wherein the collection score is determined based also on the amount owed by the debtor only to the selected creditor.

18. A computer-readable medium with program instructions for predicting a likely repayment amount from a debtor who owes an amount to a selected creditor, the program comprising a method, which, when executed on a computer system, causes the computer system to:

(A) determine a first score based on amounts owed by the debtor only to creditors other than the selected creditor,
(B) determine a second score based on an amount owed by the debtor only to the selected creditor,
(C) determine a collection score based on the first and second scores, wherein the collection score is further based on tailored characteristics from a generic database comprising:
average months in file;
number of trade lines last reported over 90 days delinquent;
percentage amount now past due of maximum historic past due;
total trade line balance;
net fraction of subscriber's accounts; and
total balance on subscriber's trade lines; and
(D) determine the likely repayment amount based on the collection score and the amount owed to the selected creditor.

19. A computer-readable medium with program instructions for predicting a likely repayment amount from a debtor who owes an amount to a selected creditor, the program comprising a method, which, when executed on a computer system, causes the computer system to:
(A) determine a first score based on amounts owed by the debtor only to creditors other than the selected creditor, wherein the first score is further based on at least one of the following tailored characteristics from a generic database:
average months in file;
number of trade lines last reported over 90 days delinquent;
percentage amount now past due of maximum historic past due;
total trade line balance;
net fraction of subscriber's accounts; and
total balance on subscriber's trade lines; and
(B) determine a second score based on an amount owed by the debtor only to the selected creditor;
(C) determine a collection score based on the first and second scores; wherein the collection score is further based on tailored characteristics from a generic database and
(D) determine the likely repayment amount based on the collection score and the amount owed to the selected creditor.

20. A computer-readable medium with program instructions for predicting a likely repayment amount from a debtor who owes an amount to a selected creditor, the program comprising a method, which, when executed on a computer system, causes the computer system to:
(A) determine a first score based on amounts owed by the debtor only to creditors other than the selected creditor;
(B) determine a second score based on an amount owed by the debtor only to the selected creditor, wherein the second score is further based on at least one of the following tailored characteristics from a generic database:
average months in file;
number of trade lines last reported over 90 days delinquent;
percentage amount now past due of maximum historic past due;
total trade line balance;
net fraction of subscriber's accounts; and
total balance on subscriber's trade lines; and
(C) determine a collection score based on the first and second scores; wherein the collection score is further based on tailored characteristics from a generic database and
(D) determine the likely repayment amount based on the collection score and the amount owed to the selected creditor.

21. A computer-readable medium with program instructions for predicting a likely repayment amount from a debtor who owes an amount to a selected creditor, the program comprising a method, which, when executed on a computer system, causes the computer system to:
(A) determine a first score based on amounts owed by the debtor only to creditors other than the selected creditor;
(B) determine a second score based on an amount owed by the debtor only to the selected creditor;
(C) determine a collection score based on the first and second scores, wherein the collection score is further based on tailored characteristics from a generic database:
average months in file;
number of trade lines last reported over 90 days delinquent;
percentage amount now past due of maximum historic past due;
total trade line balance;
net fraction of subscriber's accounts; and
total balance on subscriber's trade lines; and
(D) determine the likely repayment amount based on the collection score and the amount owed to the selected creditor.

* * * * *